J. EGGERT.
Velocipede.
No. 107,888.  Patented Oct. 4, 1870.
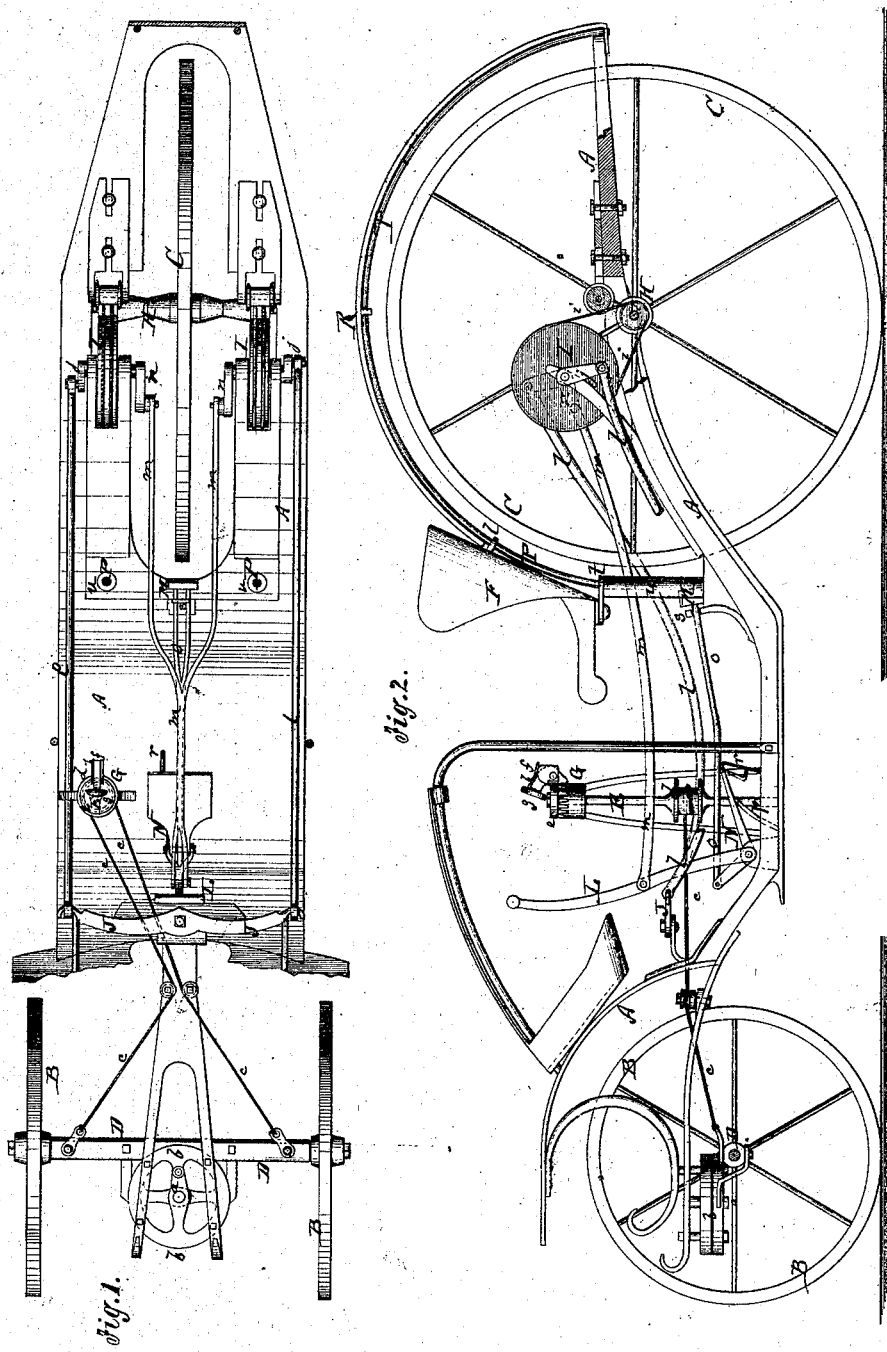
Witnesses:
Inventor:
J. Eggert
per
Attorneys.

UNITED STATES PATENT OFFICE.

JOHN EGGERT, OF NEW YORK, N. Y.

IMPROVEMENT IN VELOCIPEDES.

Specification forming part of Letters Patent No. 107,888, dated October 4, 1870.

*To all whom it may concern:*

Be it known that I, JOHN EGGERT, of the city of New York, in the county and State of New York, have invented a new and Improved Velocipede; and I do hereby declare that the following is a full, clear, and exact description thereof, which will enable others skilled in the art to make and use the same, reference being had to the accompanying drawings, forming part of this specification.

Figure 1 represents a plan or top view, partly in section, of my improved velocipede. Fig. 2 is a side elevation, partly in section, of the same.

Similar letters of reference indicate corresponding parts.

This invention relates to certain improvements in the construction of the driving, steering, and breaking gear of a three or four wheeled velocipede, and to a new manner of supporting the seat on the same.

The invention consists, first, in a new device for locking the steering-handle to a fixed notched or toothed plate, for the purpose of fixing the steering-wheels for travel in any desired direction.

The invention consists, also, in a novel combination and arrangement of hand and foot levers with the driving-gear, all parts being so arranged that either one or both hands or feet, or both hands and feet, may be used for propelling the apparatus.

The invention consists, also, in a new self-retaining brake, which will lock itself in gear when applied, requiring no additional power for holding it against the wheel.

Finally, the invention consists in supporting the seat on springs that surround the brace-rod of the frame on which said seat is vertically adjustable, all as hereinafter more fully described.

A in the drawings represents the frame of my improved velocipede. It is supported on three or more wheels, of which two, B B, are in front, and one or two, C, in rear, as shown.

The axle D of the front wheels is, by means of a king-bolt, a, pivoted to the frame A, a fifth-wheel, b, being used for the support of the frame, as shown. By means of two cords or ropes, c c, the opposite ends of the axle D are connected with a drum or pulley, d, on the steering post or shaft E. The post or shaft E is fitted vertically into the frame A, in front of the seat F, to be easily reached. At its upper end is a head, e, to which is pivoted a bell-crank, f, with a handle, g, at its end. A spring, h, serves to hold the crank f in its proper position. When the axle is to be locked in any desired position, to steer the vehicle straight forward or in a desired curve the crank f is swung down so that its inner arm passes through a slot of the head e into one of a series of notches of a ring, G. The ring G is secured stationary upon the frame A, as shown, and has its upper edge notched or toothed to receive the locking-crank f in any suitable position. The spring h also holds the crank in the locked position, as shown in Fig. 2.

The driving-wheel C has its axle H connected, by means of belts i i, with rollers I I, that are hung in the frame A, behind the seat F. The axles of the two rollers I have cranks j, that are, by means of rods l l, connected, respectively, with the ends of a lever, J. The lever J is pivoted to the floor of the frame, in front of and below the seat, as shown, and can be readily operated by the feet of the person occupying the seat. By oscillating the lever J on its pivot the rollers I will be revolved, and will impart rotary motion to the driving-wheel C.

A hand-lever, L, is also pivoted to the frame A in front of the seat, and is, by means of a bifurcated rod, m, connected with two other cranks, n, of the rollers I. The wheel C can thus be operated either by the feet alone, or by the hands, or by both at once, as may be desired.

The brake M is affixed to a lever, o, which is connected with one arm of a bell-crank, N. The free arm of the same serves as a treadle for operating the brake. A spring, p, holds the treadle up and keeps the brake off the wheel C. When the treadle is forced down, it is caught by a spring-catch, r, and held down so that the brake will be kept against the wheels as long as the treadle remains locked under the catch. The rear end of the lever o is guided by a grooved or slotted arm, s, that projects from the frame A.

The seat F has backward-projecting ears, t, that are perforated to fit over the rear semicircular arms P of the frame A, the said arms serving to support a rear shield or mud-cover, R. Below the lower set of ears t are fitted, upon the arms P, springs $u\,u$, which support the seat and give it the required elasticity.

Having thus described my invention, I claim as new and desire to secure by Letters Patent—

1. The foot-lever J, connected by the rods $l\,l$ with the driving-rollers I I, in combination with the hand-lever L, which is, by a rod, $m$, connected with the same rollers, all operating as set forth.

2. The brake M, combined with the lever $o$ and bell-crank N, and with the spring $p$, and catch $r$, all arranged to operate as set forth.

3. The seat F, fitted upon the frame-arms P, and supported by means of springs $u$, substantially as herein shown and described, the said springs being fitted around the arms P, as set forth.

JOHN EGGERT.

Witnesses:
 BENJAMIN G. HUNT,
 DENIS L. HENNESSY.